(No Model.) 2 Sheets—Sheet 2.
H. C. TAYLOR.
GRINDING MILL.
No. 430,222. Patented June 17, 1890.
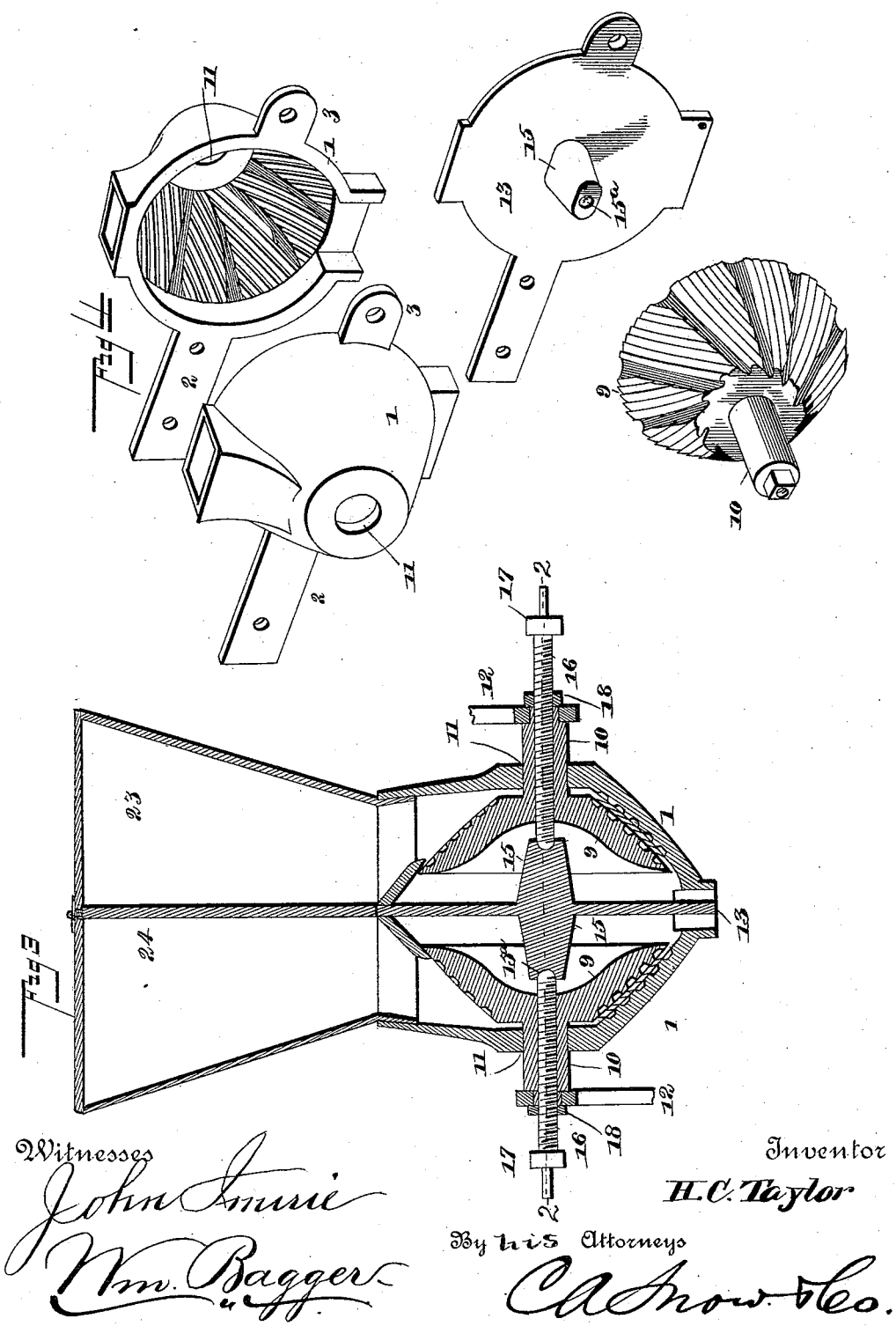
Witnesses
John Imrie
Wm. Bagger
Inventor
H. C. Taylor
By his Attorneys
C. A. Snow & Co.

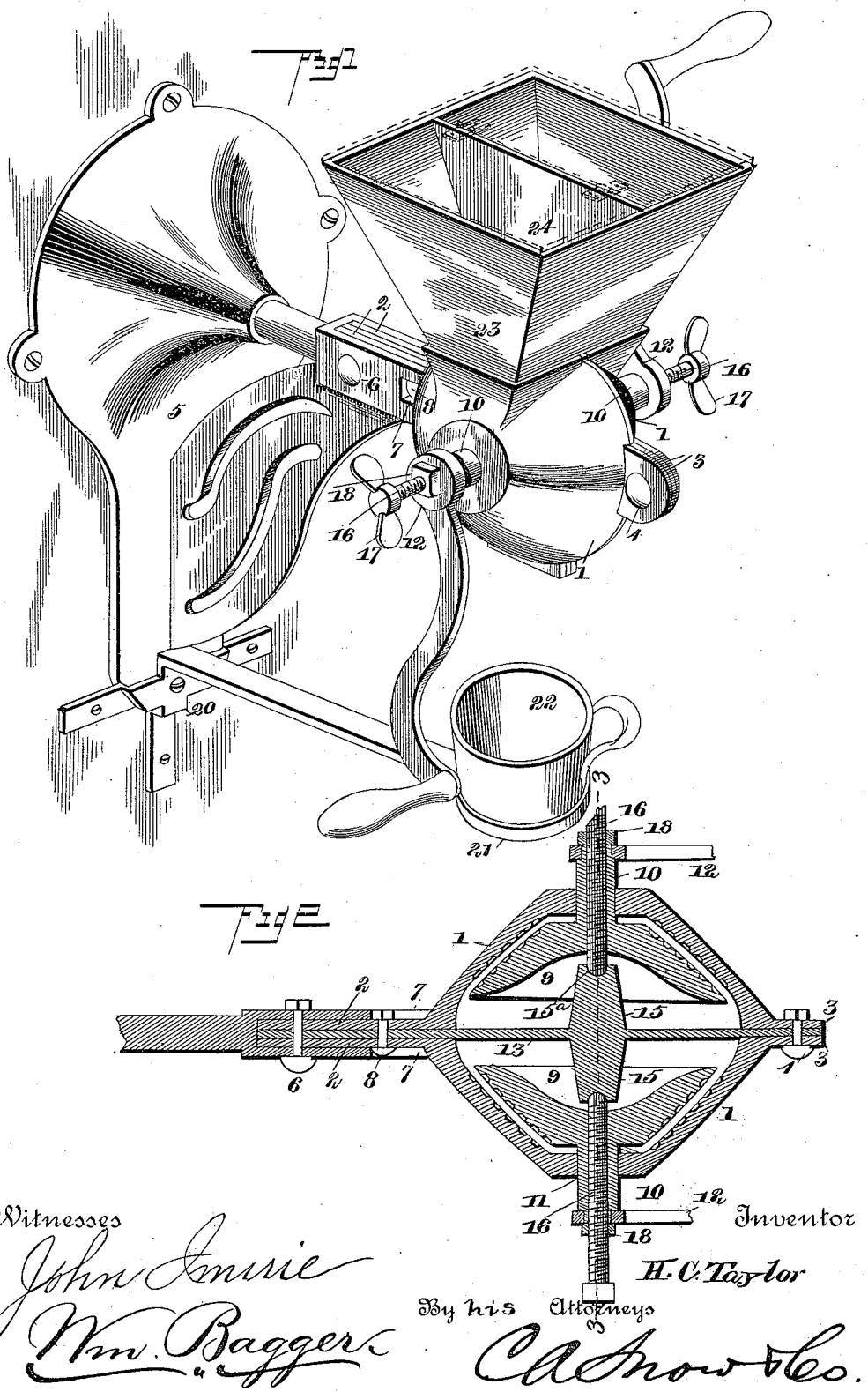

UNITED STATES PATENT OFFICE.

HENRY C. TAYLOR, OF HOMER, LOUISIANA.

GRINDING-MILL.

SPECIFICATION forming part of Letters Patent No. 430,222, dated June 17, 1890.

Application filed March 19, 1890. Serial No. 344,528. (No model.)

*To all whom it may concern:*

Be it known that I, HENRY C. TAYLOR, a citizen of the United States, residing at Homer, in the parish of Claiborne and State of Louisiana, have invented a new and useful Grinding-Mill, of which the following is a specification.

This invention relates to grinding-mills for household purposes; and it has for its object to construct a mill which shall be simple, durable, and easily operated, and which shall contain two separate burrs and grinding-compartments for the purpose of grinding various articles—such as, for instance, coffee and spices—in the same mill and without danger of becoming mixed or of destroying the flavor of each other.

With these ends in view the invention consists in the improved construction, arrangement, and combination of parts, which will be hereinafter fully described, and particularly pointed out in the claims.

In the drawings hereto annexed, Figure 1 is a perspective view of a grinding-mill embodying my improvements, showing the same in position for operation. Fig. 2 is a horizontal sectional view of the same, taken on the line 2 2, Fig. 3. Fig. 3 is a vertical transverse sectional view taken on the line 3 3 in Fig. 2. Fig. 4 is a perspective detail view showing the parts constituting the mill separated from each other.

Like numerals of reference indicate like parts in all the figures.

The casing of my improved mill is composed of the two shells or sections 1 1, having rearwardly-extending arms 2 and forwardly-extending lugs 3 3, adapted to be connected by means of clamping-bolts 4.

5 designates a bracket adapted to be secured to the wall of the apartment where the mill is to be used. The front end of the said bracket is bifurcated to receive the arms 2, that extend rearwardly from the shells of the casing, and which are secured in the front end of said bracket by means of a transverse bolt 6. The arms of the bracket 5 are provided at their front ends with horizontal notches 7, adapted to accommodate the head, and the nut of a tightening-bolt 8, which extends transversely through the arms 2.

The inner sides of the shells or sections 1 1 are corrugated to correspond with the corrugations upon the burrs 9, which are mounted in said shells, and which are conical or frustum-shaped to correspond with the interior configuration of said shells. The burrs 9 are provided at their apices with spindles 10, that extend through perforations or bearings 11 in the outsides of the shells. The outer ends of said spindles are squared to receive the cranks or handles 12, by means of which they may be operated.

The inner sides of the shells 1 1 are open and are separated by partition-plate 13, provided on opposite sides with bosses 15, having recesses or sockets 15$^a$ to receive the points of set-screws 16, which extend outwardly through the spindles of the burrs and are provided at their outer ends with thumb-pieces 17, by means of which they may be conveniently manipulated. Said set-screws are also provided with jam-nuts 18, adapted to be tightened up against the handles 12, which are thereby held securely upon the spindle 10, while at the same time by a tightening of the set-screws the burrs may be drawn up against the shells with any desired degree of tension, thus causing the material passing through the mill to be ground more or less fine, as may be desired. It is obvious that the spindles of the burrs are to be interiorly screw-threaded to engage the set-screws, the points of which latter work loosely in the sockets or recesses 15$^a$, provided for their reception in the bosses on opposite sides of the partition-plate.

20 designates a bracket secured to the wall beside or below the bracket that holds the mill, and which is provided at its outer end with a platform 21, adapted to support a cup 22, which may receive the material passing through the mill. The latter is provided with a hopper 23, suitably attached to the shells 1 1 and having a central longitudinal partition-plate 24, whereby it is divided into compartments registering with the two grinding-compartments of the mill. Said hopper may be made sufficiently large to serve as a receptacle for coffee, spices, or the like, which are to be ground in the mill, thereby dispensing with the necessity of using separate storing-vessels.

Having thus described my invention, what I claim, and desire to secure by Letters Patent of the United States, is—

1. In a household grinding-mill, the combination of the shells or casings corrugated upon their inner sides, the partition-plate provided on opposite sides with bosses extending within said casings, the burrs mounted in the said casings and having spindles extending through perforations or bearings in the latter, set-screws extending through said spindles and bearing in sockets or recesses in the bosses upon the partition-plate, and bolts connecting the casings and partition-plate, substantially as set forth.

2. In a household grinding-mill, the combination of the shells or casings corrugated upon their inner sides, the partition-plate provided on opposite sides with bosses extending into the said casings, the burrs mounted in the latter and having spindles extending through perforations or bearings therein, handles or cranks mounted upon the squared outer ends of said spindles, set-screws extending through screw-threaded perforations in the said spindles and bearing in sockets or recesses in the bosses of the partition-plate, and jam-nuts mounted upon the set-screws and tightened against the cranks or handles, substantially as set forth.

3. In a household grinding-mill, the combination, with the casing comprising the two semi-shells having forwardly-extending lugs and rearwardly-extending arms and the partition-plate interposed between said shells, of the supporting-bracket bifurcated at its front end to receive the arms extending rearwardly from said shells and partition-plate and provided at the front ends of its arms with horizontal notches to accommodate the head and nut of the tightening-bolt, substantially as set forth.

4. The combination of the bifurcated supporting-bracket, the casing comprising the semi-shells, of the partition-plate provided with bosses, the burrs mounted in said shells and having spindles extending through perforations or bearings in the latter, the handles or cranks mounted upon the outer ends of said spindles, the set-screws extending through threaded perforations in the spindles and bearing in recesses or sockets in the bosses of the partition-plate, the jam-nuts mounted upon the set-screws and tightened against the handles, and the hopper mounted upon the casing and having a vertical partition-plate, substantially as and for the purpose set forth.

In testimony that I claim the foregoing as my own I have hereto affixed my signature in presence of two witnesses.

HENRY C. TAYLOR.

Witnesses:
J. M. FINCHER,
H. S. TAYLOR.